United States Patent [19]

Sussmeier

[11] Patent Number: 4,872,891
[45] Date of Patent: Oct. 10, 1989

[54] DESICCANT SYSTEM

[75] Inventor: John Sussmeier, Danbury, Conn.

[73] Assignee: The Perkin-Elmer Corporation, Norwalk, Conn.

[21] Appl. No.: 240,972

[22] Filed: Sep. 6, 1988

[51] Int. Cl.⁴ .............................................. B01D 53/04
[52] U.S. Cl. ...................................... 55/387; 55/389; 55/502; 55/508; 55/518
[58] Field of Search .................. 55/387, 389, 502, 505, 55/508, 515, 516, 518, 519

[56] References Cited

U.S. PATENT DOCUMENTS

| | | | |
|---|---|---|---|
| 1,452,806 | 4/1923 | Hopkins | 55/518 X |
| 1,675,228 | 6/1928 | Schmidt | 55/387 X |
| 2,505,581 | 4/1950 | Unger | 55/387 X |
| 2,507,028 | 5/1950 | Lockwood | 55/387 |
| 3,057,138 | 10/1962 | Huxster | 55/515 X |
| 3,271,089 | 9/1966 | Krellen | 55/387 X |
| 3,557,534 | 1/1971 | Kennedy | 55/389 X |
| 3,853,475 | 12/1974 | Gordon et al. | 55/389 X |
| 4,486,482 | 12/1984 | Kobayashi et al. | 55/387 X |
| 4,594,082 | 6/1986 | Catherwood, Sr. | 55/387 X |
| 4,614,528 | 9/1986 | Lennen | 55/387 |

FOREIGN PATENT DOCUMENTS

| | | | |
|---|---|---|---|
| 0260986 | 3/1988 | European Pat. Off. | 55/389 |
| 62-243380 | 10/1987 | Japan | 55/387 |
| 2106416 | 4/1983 | United Kingdom | 55/387 |
| 2177016 | 1/1987 | United Kingdom | 55/387 |

Primary Examiner—Robert Spitzer
Attorney, Agent, or Firm—E. T. Grimes; H. S. Ingham

[57] ABSTRACT

A desiccant system is for maintaining an enclosure at atmospheric pressure and in a gas controlled condition. The system includes desiccant material contained in two gas permeable packets each having a flattened side. A perforated box has a cover plate and is adapted for retaining the two packets with the respective flattened sides juxtaposed. An open tube has a length to internal diameter ratio of at least about ten and an outer end open to atmosphere through the cover plate. An inner end of the tube is positioned centrally between the flattened sides of the packets. The box is insertable into a port in an enclosure with the cover plate adapted to seal the port.

3 Claims, 1 Drawing Sheet

U.S. Patent  Oct. 10, 1989  4,872,891
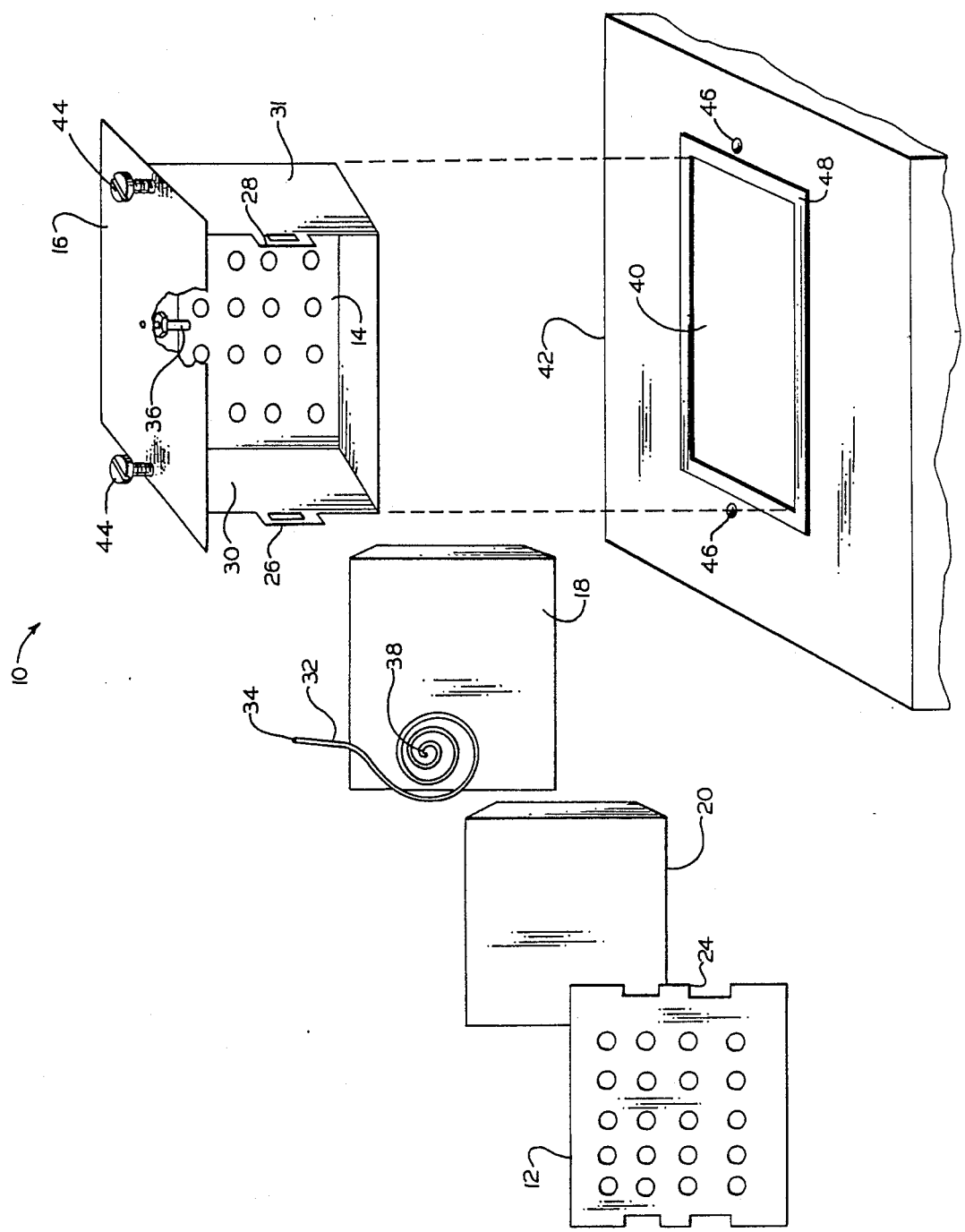

DESICCANT SYSTEM

The present invention pertains to a desiccant system and particularly to a desiccant system for maintaining an enclosure at atmospheric pressure and with a controlled gas environment.

BACKGROUND OF THE INVENTION

There often is a requirement to maintain an enclosure with a controlled gas environment such as to be free of moisture, carbon dioxide and/or oxygen. For example in a precision optical instrument such as a spectrometer, or in certain electronic equipment, it is necessary to purge and maintain the enclosure with a gas such as nitrogen. However such an enclosure is susceptible to changes in atmospheric pressure which can result in leakage. A well sealed enclosure either may buckle under pressure changes or must be designed with thick walls and specially sealed joints and is, therefore, relatively expensive.

Desiccant materials are commonly used in enclosures for adsorbing water vapor, carbon dioxide and/or oxygen that may leak in. However, such detrimental gases may reach a critical component in the instrument before being adsorbed and removed by the desiccant. Therefore such systems have been less than satisfactory.

There also is known to be a Fick's law whereby a tube, with a length to internal diameter ratio of at least ten, minimizes diffusion of gas such as water vapor from one end of the tube to the other at constant pressure. Functioning of such a tube, being statistical, does not ensure blockage of moisture from an enclosure and generally has not replaced desiccants.

SUMMARY OF THE INVENTION

Therefore objects of the present invention are to provide an improved desiccant system for an enclosure, and particularly to provide a desiccant system that allows an enclosure to be maintained at atmospheric pressure while also maintaining a controlled gas environment in the enclosure.

The foregoing and other objects are achieved by a desiccant system for an enclosure, comprising a desiccant, retainer means for retaining the desiccant in an enclosure, and a tube having a length to internal diameter ratio of at least about ten and preferably at least about 100. The tube has an outer end open to atmosphere and an inner end positioned proximate the desiccant.

According to a preferable embodiment the desiccant system comprises desiccant material contained in two gas permeable packets each having a flattened side, and a perforated box having a cover plate and being adapted for retaining the two packets with the respective flattened sides juxtaposed. An open tube with a length to internal diameter ratio of at least about ten has an outer end open to atmosphere through the cover plate. An open inner end of the tube is positioned centrally between the flattened sides of the packets. The box is insertable into a port in an enclosure with the cover plate adapted to seal the port.

BRIEF DESCRIPTION OF THE DRAWING

The drawing is an exploded view of an embodiment of the present invention.

DETAILED DESCRIPTION OF THE INVENTION

With reference to the drawing, a retaining box 10 has at least one perforated side, two shown at 12 and 14, and a cover plate 16. First and second packets of desiccant material 18,20 have a size and shape to fit somewhat tightly into the box. For example as shown the packets are in the form of flattened rectangles. One side 12 (which itself need not be perforated) has a pair of tabs 24 which fit slotted tabs 26,28 in end plates 30,31 of the box. This or any other fastener may be provided as desired for convenient replacement of the desiccant.

The desiccant is any conventional, desired type, for example Molecular Sieve TM Type 4A of Union Carbide. The packet material is porous to gas, such as Tyvek TM sold by Dupont, so that the surrounding gas may circulate freely from the perforated sides through the desiccant in the packets.

A tube 32 is provided with a length of at least 10 and preferably 100 times its internal diameter, for example 25 cm long and 1.56 mm diameter for a ratio of 160. This tube has an open outer end 34 which is connected to an orifice fitting 36 in cover plate 16. The tube is coiled and fitted so that its inner end 38 is positioned centrally between the flattened sides of the packets, effectively imbedded in the desiccant. More generally, the inner end should be at least proximate the desiccant material.

The assembled box assembly 10 with desiccant 18,20 and tube 32 is mounted in a port 40 in an enclosure 42 containing the desired sensitive optical and/or electrical components or the like (not shown). Screws 44 thread into tapped holes 46 or retained nuts next to the port on the enclosure to retain the box in port 40. A gasket 48 seals the cover plate to the enclosure. The outer end of tube 32 is open to the atmosphere via fitting 36 in cover plate 16.

Other variations are possible within the spirit of the invention. For example, a desiccant box may be mounted on the enclosure with a perforated bottom plate sealed over the port, the box thus being essentially an extension of the enclosure.

In use the tube of at least 10 to one length to diameter ratio minimizes diffusion of air and moisture from the surrounding atmosphere into the enclosure, while allowing pressure inside to equalize to atmospheric. A ratio of 100 increases the reliability especially with some expected air flow when there are small pressure differentials from varying atmospheric pressure. Furthermore, with the inner end 38 of the tube being proximate and preferably imbedded in the desiccant according to the present invention, any minute amounts of moisture and other undesirable constituents of air that do find their way through the tube are immediately adsorbed by the desiccant.

It has been found that with 192 gms of desiccant in an assembly as described herein mounted in an enclosure having a volume of 17 liters, moisture and carbon dioxide are maintained satisfactorily low at approximately 1% of atmospheric for at least 6 months before it becomes necessary to replace the desiccant and repurge the enclosure.

While the invention has been described above in detail with reference to specific embodiments, various changes and modifications which fall within the spirit of the invention and scope of the appended claims will become apparent to those skilled in the art. The invention is therefore only intended to be limited by the appended claims or their equivalents.

What is claimed is:

1. A desiccant system for an enclosure, comprising desiccant material contained in two gas permeable packets each having a flattened side, a perforated box having a cover plate and being adapted for retaining the two packets with the respective flattened sides juxtaposed, and an open tube having a length to internal diameter ratio of at least about ten and further having an outer end open to atmosphere through the cover plate and an inner end positioned centrally between the flattened sides of the packets, the box being insertable into a port in an enclosure with the cover plate adapted to seal the port, whereby the enclosure is maintained at atmospheric pressure and in a gas controlled condition.

2. A desiccant system according to claim 1 wherein the tube is coiled between the packets.

3. A desiccant system according to claim 2 wherein the length to internal diameter ratio is at least about 100.

* * * * *